United States Patent
Ikeda (10) Patent No.: US 9,894,288 B2
(45) Date of Patent: Feb. 13, 2018

(54) IMAGE FORMING METHOD FOR FORMING A HIGH-RESOLUTION IMAGE, AND A RELATED IMAGE FORMING APPARATUS AND IMAGE FORMING PROGRAM

(71) Applicant: CANON KABUSHIKI KAISHA, Tokyo (JP)

(72) Inventor: Hajime Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/172,500

(22) Filed: Jun. 3, 2016

(65) Prior Publication Data

US 2016/0373658 A1    Dec. 22, 2016

(30) Foreign Application Priority Data

Jun. 17, 2015   (JP) ................................ 2015-121779

(51) Int. Cl.
| | |
|---|---|
| H04N 5/235 | (2006.01) |
| H04N 5/232 | (2006.01) |
| G06T 5/50 | (2006.01) |
| G06T 7/32 | (2017.01) |
| G06T 3/40 | (2006.01) |

(52) U.S. Cl.
CPC ......... *H04N 5/2355* (2013.01); *G06T 3/4069* (2013.01); *G06T 5/50* (2013.01); *G06T 7/32* (2017.01); *H04N 5/23232* (2013.01); *G06T 2207/20212* (2013.01)

(58) Field of Classification Search
CPC .. H04N 5/265; H04N 5/2355; H04N 5/23232; G06T 7/0024; G06T 7/30

USPC ....................................................... 348/222.1
See application file for complete search history.

(56) References Cited

U.S. PATENT DOCUMENTS

| | | | |
|---|---|---|---|
| 7,151,801 B2 | 12/2006 | Grossberg et al. | |
| 7,162,086 B2 | 1/2007 | Ikeda | |
| 7,623,174 B2 | 11/2009 | Kanamori et al. | |
| 7,636,393 B2 | 12/2009 | Kanamori et al. | |
| 8,009,933 B2 | 8/2011 | Tanaka et al. | |
| 8,249,370 B2 | 8/2012 | Kanamori et al. | |
| 8,405,763 B2 | 3/2013 | Veeraraghavan et al. | |
| 9,076,234 B2 * | 7/2015 | Zheng | G06T 3/4053 |
| 9,118,854 B2 * | 8/2015 | Iwasaki | H04N 5/361 |
| 9,153,010 B2 * | 10/2015 | Tezuka | H04N 1/40068 |

(Continued)

FOREIGN PATENT DOCUMENTS

| | | |
|---|---|---|
| JP | 2006-127241 A | 5/2006 |
| JP | 2007-174689 A | 7/2007 |

(Continued)

*Primary Examiner* — Pritham Prabhakher
(74) *Attorney, Agent, or Firm* — Fitzpatrick, Cella, Harper & Scinto (57) ABSTRACT

Images are combined with high accuracy, and a high-definition image that is superior in the sensitivity and the saturation characteristics is formed. An image forming method includes detecting a difference between a plurality of images by comparing respective high-resolution areas included in the plurality of images; based on the difference, adjusting position information associated with the plurality of images, respectively; and combining respective low-resolution areas of the plurality of images in which the pieces of position information is adjusted.

11 Claims, 9 Drawing Sheets

(56) References Cited

U.S. PATENT DOCUMENTS

| | | | | |
|---|---|---|---|---|
| 2005/0147321 A1* | 7/2005 | Damera-Venkata | ... | G09G 3/007 382/275 |
| 2007/0223887 A1* | 9/2007 | Kanamori | ............ | G06T 3/4053 386/232 |
| 2008/0291304 A1* | 11/2008 | Ota | .................. | H01L 27/14603 348/294 |
| 2009/0060337 A1* | 3/2009 | Novikov | .................. | G06K 9/40 382/181 |
| 2010/0026825 A1* | 2/2010 | Doida | ....................... | G06T 3/40 348/222.1 |
| 2011/0002534 A1* | 1/2011 | Misawa | ................ | G09G 5/024 382/162 |
| 2011/0115934 A1* | 5/2011 | Wang | ................... | G06T 3/4076 348/222.1 |
| 2011/0187910 A1* | 8/2011 | Nikai | .................... | H04N 5/357 348/308 |
| 2013/0308877 A1* | 11/2013 | Tezuka | .............. | H04N 1/40068 382/300 |
| 2014/0022427 A1* | 1/2014 | Goto | ................... | H04N 5/2355 348/296 |

FOREIGN PATENT DOCUMENTS

| | | |
|---|---|---|
| JP | 2009-020879 A | 1/2009 |
| JP | 2010-226228 A | 10/2010 |
| JP | 2012-134963 A | 7/2012 |
| JP | 2014-044360 A | 3/2014 |
| WO | 2007-029443 A1 | 3/2007 |

\* cited by examiner

IMAGE FORMING METHOD FOR FORMING A HIGH-RESOLUTION IMAGE, AND A RELATED IMAGE FORMING APPARATUS AND IMAGE FORMING PROGRAM

BACKGROUND OF THE INVENTION

Field of the Invention

The present invention relates to an image forming method, an image forming apparatus, and an image forming program.

Description of the Related Art

Conventionally, a method of forming a high-resolution image based on a plurality of low-resolution images has been proposed. For example, Japanese Patent Application Laid-open No. 2006-127241 discloses a method of aligning a plurality of low-resolution images on a high-resolution space and estimating positions of pixels of the plurality of aligned low-resolution images. This method is intended to realize a faster process by dividing a high-resolution space into a plurality of areas and assuming representative positions of the areas as estimated values of all the pixels present in the areas.

In Japanese Patent Application Laid-open No. 2006-127241, however, the accuracy is limited because a shift amount is estimated based on low-resolution images. Further, since calculation for estimating shift amounts is required, this results in longer processing time and increased consumption power of a device.

SUMMARY OF THE INVENTION

An image forming method according to the present disclosure has the steps of acquiring a plurality of images, each of which includes a high-resolution area and a low-resolution area; detecting a difference between the plurality of images by comparing respective high-resolution areas of the plurality of images; based on the difference, adjusting position information associated with the plurality of images, respectively; and combining respective low-resolution areas of the plurality of images in which the position information is adjusted.

Furthermore, an image forming apparatus according to the present disclosure has a unit adapted to acquire a plurality of images, each of which includes a high-resolution area and a low-resolution area; a unit adapted to detect a difference between the plurality of images by comparing respective high-resolution areas of the plurality of images; a unit adapted to, based on the difference, adjust position information associated with the plurality of images, respectively; and a unit adapted to combine the low-resolution areas of the plurality of images in which the position information is adjusted.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
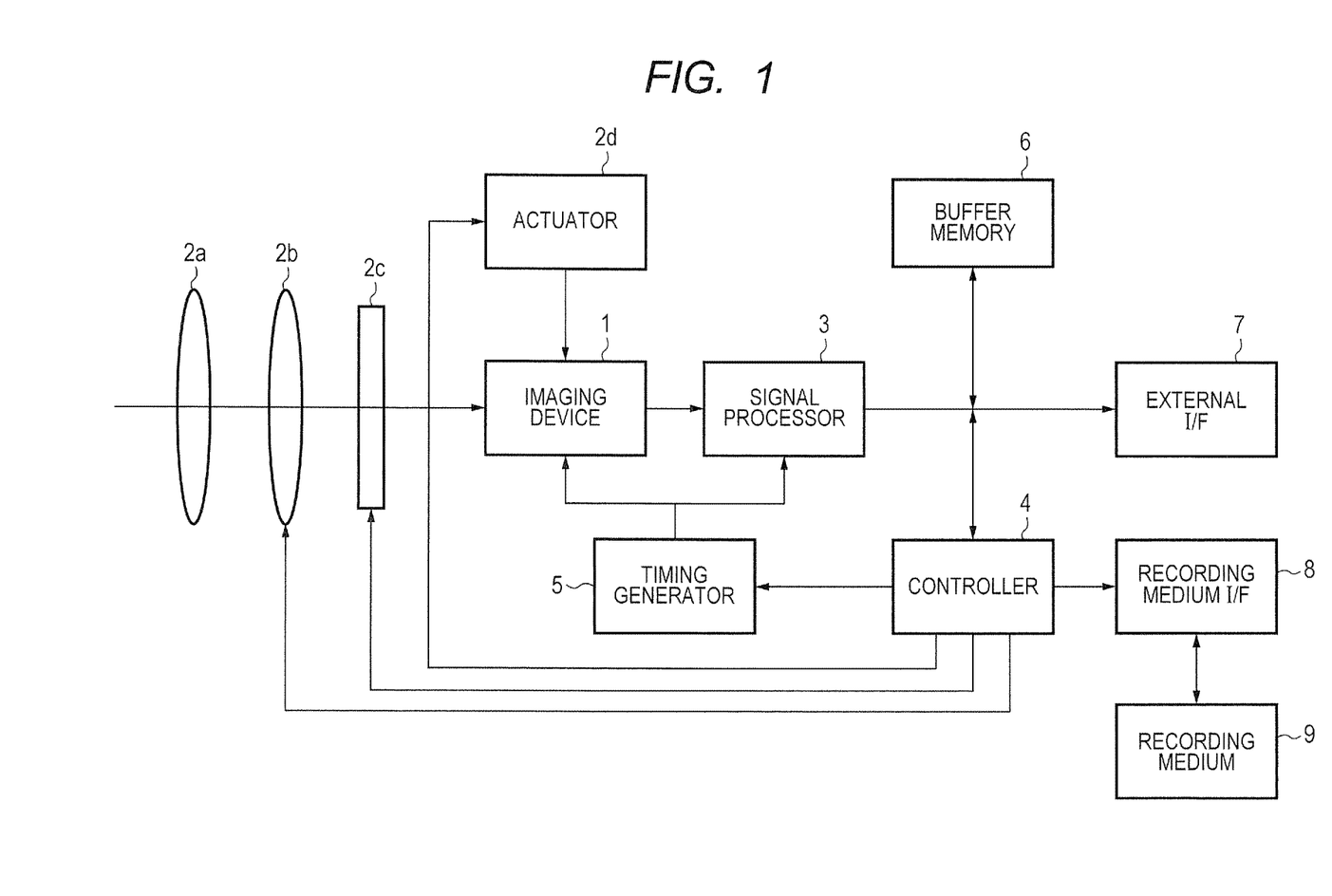
FIG. 1 is a block diagram of an image forming apparatus according to a first embodiment.

An image forming apparatus and an image forming method according to the first embodiment of the present invention will be described. FIG. 1 is a block diagram of a digital still camera as an example of an image forming apparatus according to the present embodiment. The digital still camera includes an imaging device 1 that is a solid state imaging device, a lens 2a that causes an optical image of a subject to be captured on the imaging device 1, an aperture 2b for changing a light amount that has passed through the lens 2a, a mechanical shutter 2c, and an actuator 2d. An image system further includes a signal processor 3, a controller 4, a timing generator 5, a buffer memory 6, an external I/F 7, a recording medium I/F 8, and a recording medium 9.

The imaging device 1 is formed of a CMOS image sensor or a CCD image sensor and converts an optical image captured on an image plane through the lens 2a into an image signal. The actuator 2d is provided with a piezoelectric element, for example, and is able to move the imaging device 1 in a horizontal direction or a vertical direction with respect to the image plane. The signal processor 3 processes image signals from the imaging device 1 and forms a high-definition image from a plurality of low-resolution images. That is, the signal processor 3 functions as a computer for executing an image forming program according to the present embodiment. Further, a signal processor 3 can perform processes of various corrections and/or data compression on an image signal. Note that a circuit of an AD convertor that converts an analog signal to a digital signal and a circuit of the signal processor 3 may be formed on a semiconductor substrate of the imaging device 1. The timing generator 5 outputs various timing signals to the imaging device 1 and the signal processor 3. The controller 4 controls the entire digital still camera, and the buffer memory 6 functions as a frame memory for temporarily storing image data. The external I/F 7 is an interface for communicating with an external apparatus such as a computer. In this regard, timing signals may be input from the external apparatus of the image forming system. The recording medium I/F 8 is an interface with the recording medium 9 and records or reads out image data in the recording medium 9. The recording medium 9 is formed of a removable semiconductor memory and records and reads out image data.

Figure 2:
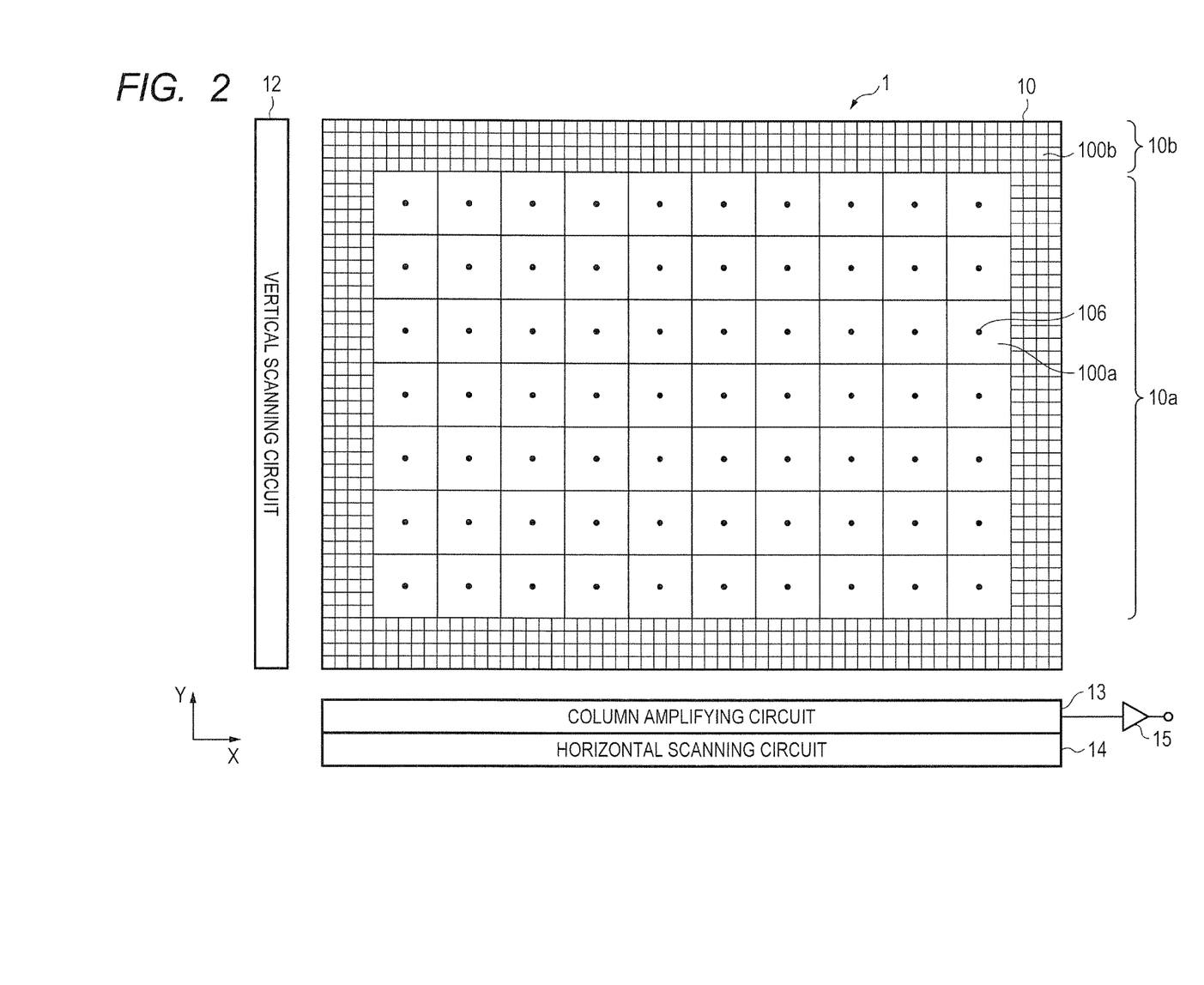
FIG. 2 is a block diagram of an imaging device according to the first embodiment.

FIG. 2 is a block diagram of the imaging device 1 according to the present embodiment. The imaging device 1 includes a pixel array 10, a vertical scanning circuit 12, a column amplifying circuit 13, a horizontal scanning circuit 14, and an output circuit 15. The pixel array 10 includes a plurality of pixels arranged in an X-Y matrix and has a low-resolution area 10a located in the center and having a larger pixel pitch (interval) and a high-resolution area 10b located in the peripheral portion and having a smaller pixel pitch. As an example, pixels (first pixels) 100a of the low-resolution area 10a are arranged by the interval of 7.5 µm in respective directions of the matrix, and pixels (second pixels) 100b of the high-resolution area 10b are arranged by the interval of 1.5 µm in respective directions of the matrix. That is, the pixel pitch of the high-resolution area 10b is one-fifth the pixel pitch of the low-resolution area 10a. The pixel pitches are not limited to this example, and any ratio of respective pixel pitches for the areas 10a and 10b may be defined, or respective pixel pitches in the X and Y directions may be changed. Note that, the low-resolution area 10a may be formed with a larger area of an opening, a larger pitch between adjacent openings, and/or a larger wiring pitch between adjacent pixels, compared to the high-resolution area 10b. A smaller pixel pitch results in a larger area of wirings that occupy a pixel and thus the sensitivity decreases and noise is likely to increase. It is therefore preferable to take into consideration of a balance between the sensitivity and the resolution to define the pixel pitch.

The low-resolution area 10a may include 1920 pixels in the column direction by 1080 pixels in the row direction, that is, 2073600 pixels in total, for example, in order to acquire a primary image. The number of pixels is not limited thereto, and more number of pixels or less number of pixels may be employed. The low-resolution area 10a may include pixels such as optical black pixels, dummy pixels having no photoelectric convertor, or the like, which do not directly output an image, other than effective pixels. The pixel 100a may include one or more sets of a micro lens and a photodiode (a photoelectric conversion element). Further, on the pixel 100a, a color filter that controls the spectral sensitivity characteristics is arranged. Note that, in order to maximize the sensitivity and an accumulated charge amount within a photodiode, it is preferable to provide a pair of a micro lens and a photodiode near the center 106 of the pixel 100a.

The high-resolution area 10b is arranged in the outer peripheral of the low-resolution area 10a. That is, the low-resolution area 10a that acquires a primary image is arranged in the center of the pixel array 10 and the high-resolution area 10b having a narrow pitch surrounds the outer peripheral of the low-resolution area 10a. Such a configuration allows for an easier trimming and removal of images of the high-resolution area 10b. Note that the high-resolution area 10b may not necessarily surround the low-resolution are 10a and may be arranged only in a part of each side of the low-resolution area 10a, for example.

The vertical scanning circuit 12 supplies control signals for controlling transistors of the pixels 100a and 100b to turn on (in a conduction state) or turn off (in a non-conduction state). Each column of the pixels 100a and 100b is provided with a not-shown vertical signal line, and signals from the pixels 100a and 100b are read out on a column basis. The column amplifying circuit 13 amplifies pixel signals output to vertical signal lines and performs a correlated double sampling based on a signal at the time of a reset and a signal at the time of a photoelectric conversion. The horizontal scanning circuit 14 has switches connected to amplifiers of the column amplifying circuit 13 and supplies control signals for controlling the switches to turn on or turn off. The output circuit 15 is formed of a buffer amplifier, a differential amplifier, or the like and outputs a pixel signal from the column amplifying circuit 13 to the signal processor 3 located outside the imaging device 1. Note that, as described above, an AD converter may be provided to the imaging device 1 and a digital image signal may be output to the signal processor 3.

Figure 3A:
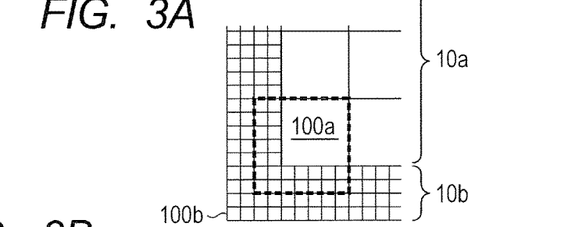
FIG. 3A and FIG. 3B include a circuit diagram of a pixel array according to the first embodiment.
Figure 3B:
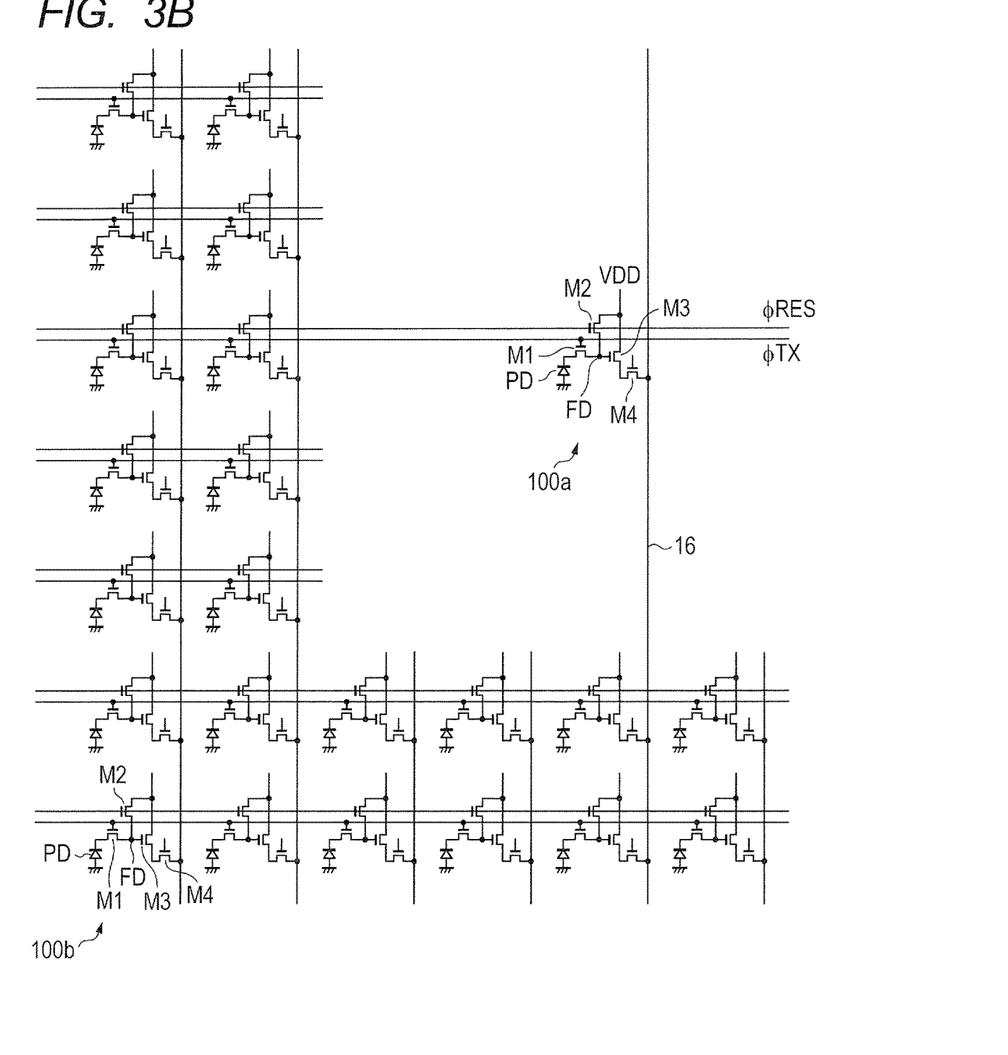

FIG. 3A and FIG. 3B include a circuit diagram of the pixel array 10 according to the present embodiment. A circuit diagram illustrated in FIG. 3B corresponds to a part of the pixel array 10 surrounded by a broken line in FIG. 3A and illustrates a single pixel 100a located at a corner of the low-resolution area 10a and a plurality of pixels 100b of the high-resolution area 10b adjacent to the single pixel 100a.

The pixels 100a and 100b have the same circuit configuration and each include a photodiode PD, a charge-voltage converter FD, a transfer transistor M1, a reset transistor M2, an amplifying transistor M3, and a selection transistor M4. Note that, in the pixels 100a and 100b, a plurality of photodiodes PDs may have a configuration to share the charge-voltage converter FD, the reset transistor M2, the amplifying transistor M3, and the selection transistor M4. Further, the transistors M2 to M4 are not limited to an N-channel MOS but may be formed of a P-channel MOS.

The photodiode PD performs a photoelectric-conversion of an irradiated light into electrons (charges). A signal line TX is connected to the gate of the transfer transistor M1 and, in response to the signal line TX turning to a high level, the transfer transistor M1 transfers charges generated at the photodiode PD to the charge-voltage convertor FD. The charge-voltage converter FD is a floating diffusion capacitor that holds charges transferred from the photodiode PD via the transfer transistor M1. A signal line RES is connected to the gate of the reset transistor M2 and, in response to the signal line RES turning to a high level, the reset transistor M2 resets the voltage of the charge-voltage converter FD to the reset voltage VDD. The transfer transistor M1 and the reset transistor M2 are simultaneously turned on and thereby electrons of the photodiode PD are reset. The gate of the amplifying transistor M3 is connected to the charge-voltage converter FD.

The source of the amplifying transistor M3 is electrically connected via the selection transistor M4 to a vertical signal line 16 common to each column to form a source follower. A signal line SEL (not shown) is connected to the gate of the selection transistor M4 and, in response to the signal line SEL turning to a high level, the vertical signal line 16 and the amplifying transistor M3 are electrically connected. Thereby, a pixel signal is read out from the selected pixel 100a.

The signal lines TX, RES, and SEL are extended from the vertical scanning circuit 12 to each row of the pixel array 10. The vertical scanning circuit 12 scans the pixel 100a on a row basis by controlling these signal levels. The signal lines TX, RES, and SEL and the vertical signal line 16 connected to the pixel 100a of the low-resolution area 10a are also connected in the pixel 100b of the high-resolution area 10b. That is, the signal lines TX, RES, and SEL of the pixel 100a are connected to the pixel 100b on the same row, and the vertical signal line 16 of the pixel 100a is connected to the pixel 100b on the same column. On the other hand, each of other pixels 100b of the high-resolution area 10b is connected to the signal lines TX, RES, and SEL and a vertical signal line 16 that are driven from the outer peripheral portion. That is, these signal lines are provided only in the high-resolution area 10b without traversing the low-resolution area 10a. In the present embodiment, since the high-resolution area 10b is provided around the low-resolution area 10a, the number of wirings traversing the low-resolution area 10a can be reduced.

In general, a signal line requires a certain width or a width wider than the certain width in terms of a reduction of the electrical resistance and a limit in patterning. With an increased number of signal lines, an upper part of the photodiode PD would be covered and the sensitivity to a light would decrease. Further, a wiring located near the photodiode PD may cause a reduction of the sensitivity to a light entering from an oblique direction. Because of the low-resolution area 10a being an area for acquiring a primary image, the low-resolution area 10a is preferably of high sensitivity and preferably has less reduction of the sensitivity to an oblique incident light. Therefore, the number of signal lines is desirably lower in the low-resolution area 10a. On the other hand, in the high-resolution area 10b, there is no problem even when the sensitivity and the oblique incidence property are relatively low, as long as it can sense a shift amount. In view of the foregoing, in the present embodiment, the reduction in the sensitivity and in the oblique incidence property of the low-resolution area 10a can be prevented by providing the high-resolution area 10b around the low-resolution area 10a and driving the signal lines of the high-resolution area 10b from the outer peripheral. Further, a difference in the position information associated with images, that is, a shift amount can be detected with high accuracy by reducing the pixel pitch of the high-resolution area 10b as much as possible.

Figure 4:
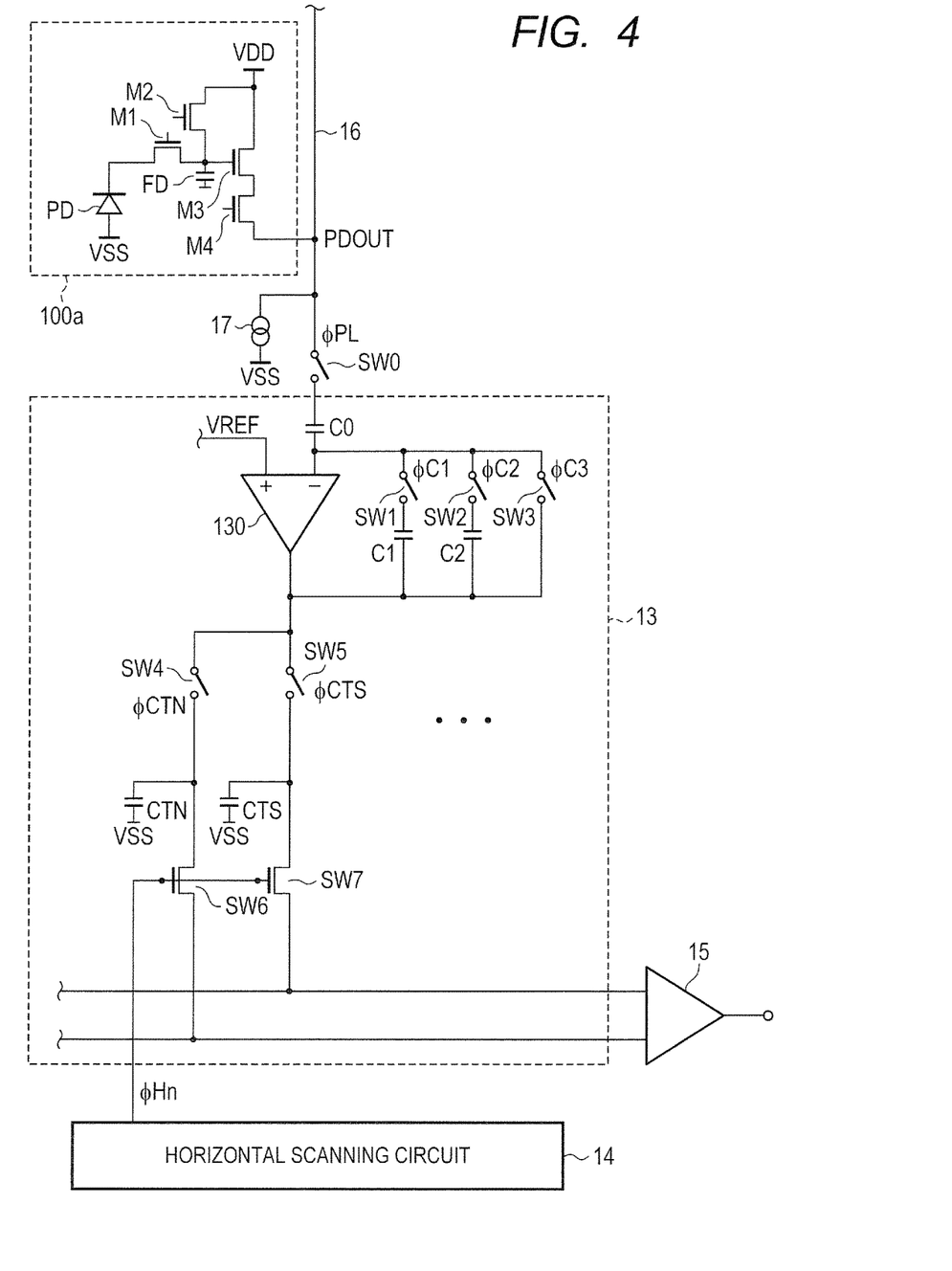
FIG. 4 is a circuit diagram of a pixel and a column amplifying circuit according to the first embodiment.

FIG. 4 is a circuit diagram of the pixel 100a and the column amplifying circuit 13 according to the present embodiment. To simplify the description here, a circuit for a single column of the column amplifying circuit 13 and a single pixel 100a are depicted. The source of the transistor M3 is electrically connected via the selection transistor M4 to a node PDOUT of the vertical signal line 16 common to each column to form a source follower. In response to the selection transistor M4 turning on, the vertical signal line 16 and the amplifying transistor M3 are electrically connected and a pixel signal is read out. A current source 17 supplies a current to the pixel 100a via the vertical signal line 16, and the vertical signal line 16 is connected to the column amplifying circuit 13 via a switch SW0 driven by a signal PL.

The column amplifying circuit 13 has a column amplifier 130, an input capacitor C0, feedback capacitors C1 and C2, switches SW1 to SW7, and capacitors CTN and CTS. The column amplifier 130 is formed of a differential amplifying circuit having an inverting input node, a non-inverting input node, and an output node. The inverting input node of the column amplifier 130 is electrically connected to the vertical signal line 16 via the input capacitor C0, and a reference voltage VREF is applied to the non-inverting input node. The inverting input node and the output node are connected to each other via three feedback circuits connected in parallel. A first feedback circuit is formed of a switch SW1 and a feedback capacitor C1 connected in series, a second feedback circuit is formed of a switch SW2 and a feedback capacitor C2 connected in series, and a third feedback circuit is formed of a switch SW3. The amplification factor of the column amplifier 130 can be changed by properly controlling the turning on and off of the switches SW1 to SW3. That is, the amplification factor is C0/C1 when only the switch SW1 is turned on, and the amplification factor is C0/C2 when only the switch SW2 is turned on. Further, the amplification factor is C0/(C1+C2) when the switches SW1 and SW2 are turned on, and the column amplifier 130 operates as a voltage follower when the switch SW3 is turned on. The switches SW1 to SW3 are controlled by signals φC1 to φC3, respectively.

The output node of the column amplifier 130 is connected to a capacitor CTN via a switch SW4 controlled by a signal φCTN. In a similar manner, the output node of the column amplifier 130 is connected to a capacitor CTS via a switch SW5 controlled by a signal φTS. At a reset of the charge-voltage converter FD, the switch SW4 is turned on and the switch SW5 is turned off, and a pixel signal at the reset (N signal) is sampled-and-held in the capacitor CTN. After photoelectric-converted charges are transferred to the charge-voltage converter FD, the switch SW4 is turned off and the switch SW5 is turned on and a pixel signal based on the photoelectric-converted charges (S signal) is sampled-and-held in the capacitor CTS.

The capacitor CTN is connected to a first input node of the output circuit 15 via a switch SW6, and the capacitor CTS is connected to a second input node of the output circuit 15 via a switch SW7. The horizontal scanning circuit 14 sequentially sets a signal φHn of each column to a high level to perform a horizontal scanning. That is, in response to the signal φHn being in a high level, the switch SW6 outputs the N signal held in the capacitor CTN to the first input node of the output circuit 15, and the switch SW7 outputs the S signal held in the capacitor CTS to the second input node of the output circuit 15.

The output circuit 15 is formed of a differential amplifying circuit and amplifies and outputs a difference between the input S signal and the input N signal to output a pixel signal in which a noise component at the reset has been removed. Note that a correlative double sampling may be applied after the N signal and the S signal are subjected to an analog-to-digital conversion. As described above, an optical signal input to the imaging device 1 is read out as an electrical signal, and a digital image signal is output to the signal processor 3.

Figure 5:
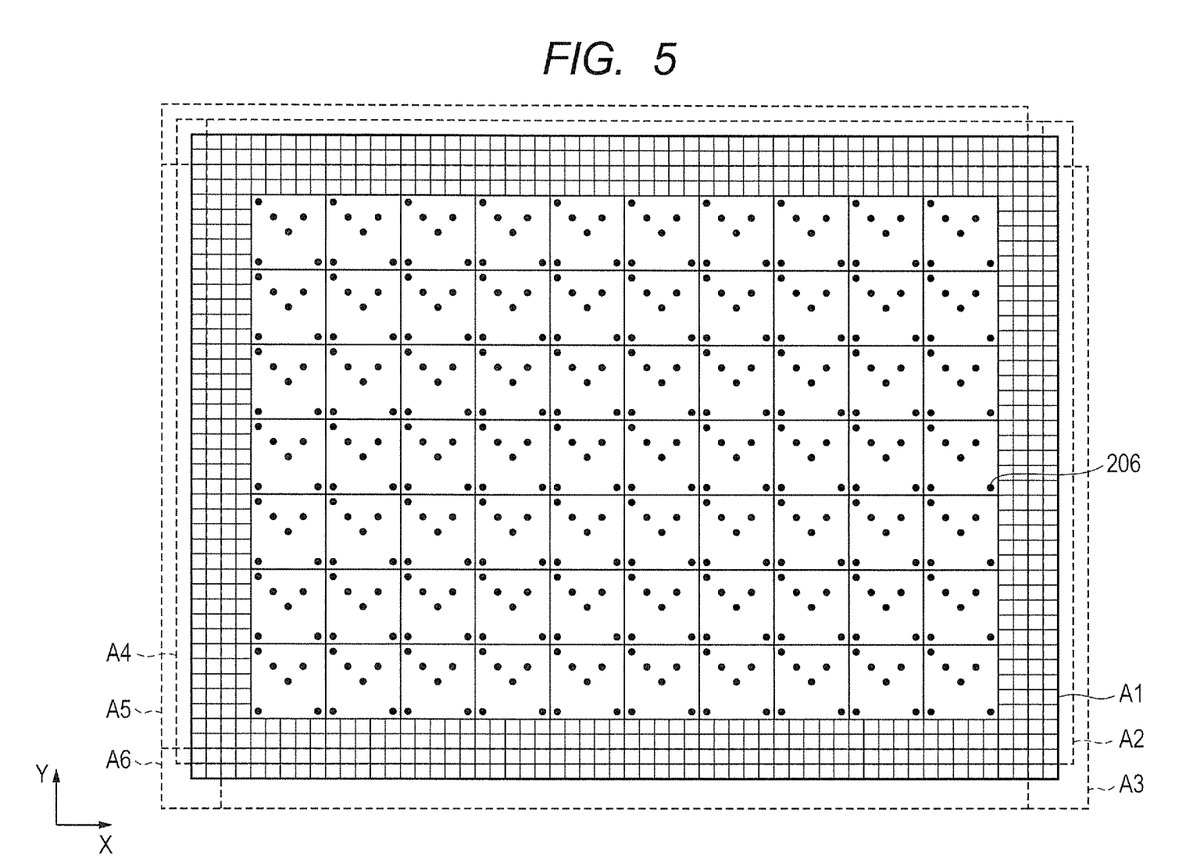
FIG. 5 is a diagram for illustrating an image forming method according to the first embodiment.
Figure 6:
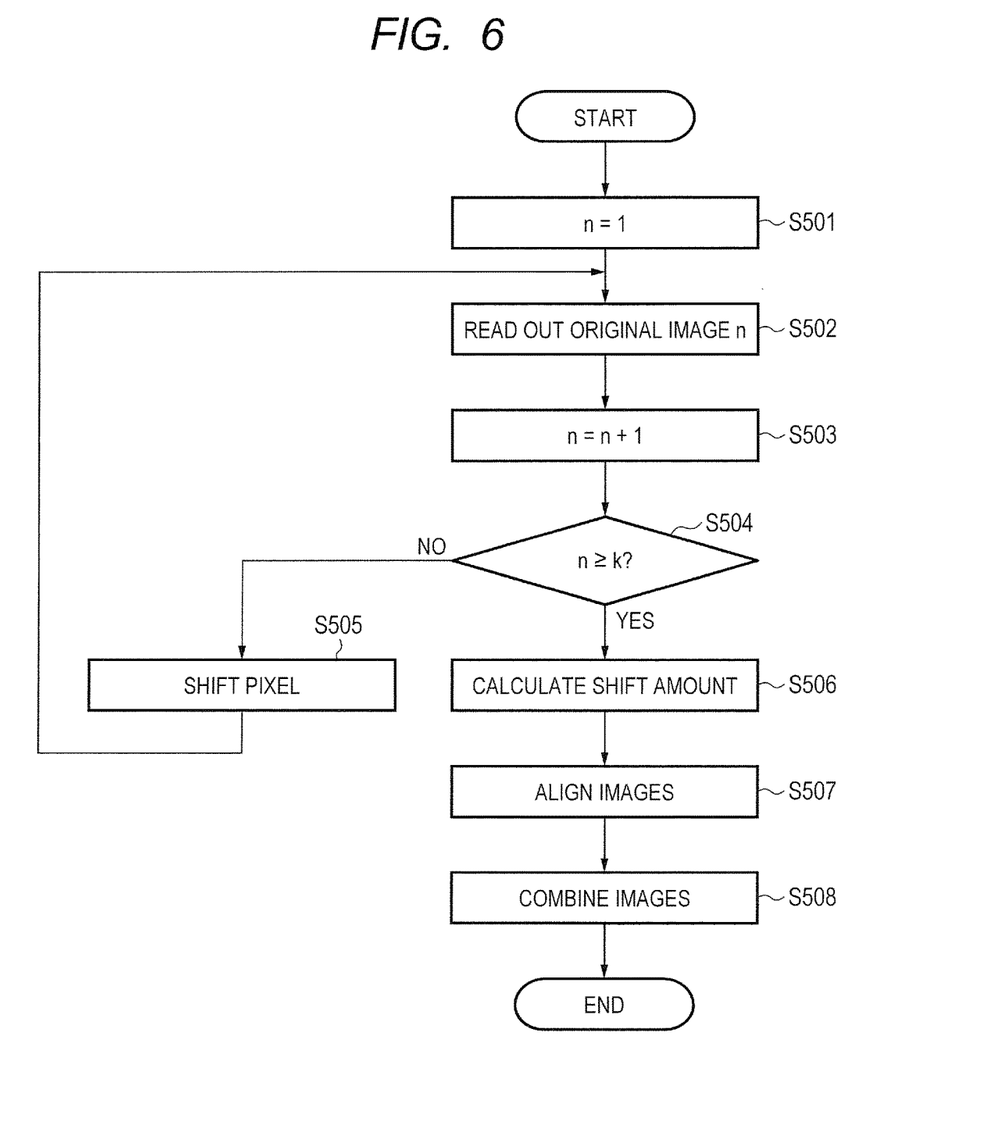
FIG. 6 is a flowchart of the image forming method according to the first embodiment.

Next, an image forming method according to the present embodiment will be described with reference to FIG. 5 and FIG. 6. FIG. 5 is a diagram illustrating the image forming method according to the present embodiment, and FIG. 6 is a flowchart of the image forming method. In FIG. 5, an image data obtained respectively from the areas 10a and 10b of the pixel array 10 has a data density corresponding to a pixel pitch. That is, an image data from the low-resolution area 10a has a data density corresponding to a pixel pitch of 7.5 µm, and an image data from the high-resolution area 10b has a data density corresponding to a pixel pitch of 1.5 µm. In the following, an image corresponding to each pixel pitch of the areas 10a and 10b is referred to as "original image". Further, an image that is ideal under the assumption of being captured with pixels of an indefinitely small pitch is referred to as "ideal image". In the present embodiment, a higher definition image than original images can be obtained by acquiring a plurality of original images while shifting the imaging device 1 in the X direction and/or the Y direction with respect to a subject and by superimposing (combining) these original images. An image obtained in such a way is referred to as "high-definition image".

In FIG. 6, the signal processor 3 sets to 1 a variable n indicating the original image number (step S501) and reads out image data from the pixel array 10 (step S502). An image first acquired is referred to as "original image 1". The original image 1 is an image of the pixel array 10 at a position A1 depicted in FIG. 5. When the coordinates in the upper-left portion of the low-resolution area 10a of original image 1 are defined as (0, 0), coordinates (Xr1, Yc1) of the pixel center 106 on a row R and a column C is expressed as Equation 1.

$$(Xr1, Yc1) = ((R-1+0.5) \times 7.5 \text{ μm}, (C-1+0.5) \times 7.5 \text{ μm}) \quad \text{Equation 1}$$

A value of each pixel of original image 1 is represented as f(Xr1, Yc1). Original image 1 represented as the pixel value f(Xr1, Yc1) is held in the buffer memory 6. The signal processor 3 increments the variable n (step S503) and determines whether or not the variable n exceeds a predetermined value k (step S504). For example, when six original images are combined, k is set to 6. At this time, since the variable n is 2 (step S504, NO), the controller 4 actuates the actuator 2d to shift the pixel array 10 by (x2, y2) μm (step S505). In FIG. 5, the pixel array 10 is shifted by 1.5 μm in the X and Y directions, respectively, from the position A1 to move to a position A2. The signal processor 3 reads out image data from the pixel array 10 as original image 2. Here, coordinates (Xr2, Yc2) of the pixel center 106 on a row R and a column C in the original image 2 are expressed as Equation 2.

$$(Xr2, Yc2) = ((R-1+0.5) \times 7.5 \text{ μm} + x2, (C-1+0.5) \times 7.5 \text{ μm} + y2) \quad \text{Equation 2}$$

A value of each pixel of the original image 2 is represented as f(Xr2, Yc2), and the signal processor 3 saves the original image 2 represented as the pixel value f in the buffer memory 6. Afterward, the signal processor 3 repeatedly performs steps S502 to S505 until the variable n reaches the predetermined value k (step S504, YES) and reads out k original images. Here, a pixel value of original image n is expressed by f(Xrn, Ycn) (n=1, 2, 3, . . . , k). Note that, in order to obtain a high-definition image in a combining process of original images described later, original images 1 to k are preferably captured at the same exposure. When exposures are different, it is desirable to multiply pixel values f(Xrn, Ycn) of original images 1 to k by correction coefficients to compensate the difference of exposures of original images 1 to k.

Next, the signal processor 3 calculates a shift amount of original images 2 to n with respect to original image 1 in the high-resolution area 10b (step S506). In order to superimpose a plurality of original images to form a high-definition image, it is necessary to accurately detect shift amounts (xn, yn) (n=1, 2, 3, . . . , k) of original images 1 to k. It is possible to detect approximate shift amounts (xn, yn) by detecting a motion amount of the actuator 2d. When the angle and the position of a camera are shifted, however, a shift amount of an original image cannot be accurately determined by merely detecting a motion amount of the actuator 2d. The angle and/or the position of a camera is likely to displace while capturing a plurality of original images, and the shift becomes remarkable especially when a camera is held by a hand(s). In such a way, it is desirable to detect shift amounts based on captured images when taking a blurring of a camera itself into consideration. On the other hand, when the number of pixels in the entire pixel array 10 is increased in order to detect shift amounts with high accuracy, a light receiving area decreases and the signal-to-noise ratio is degenerated. According to the present technique, various problems described above can be solved by providing the high-resolution area 10b separately from the low-resolution area 10a and detecting shift amounts of original images based on images of the high-resolution area 10b.

A scheme of calculating shift amounts (step S506) in the present embodiment will be described below. First, the signal processor 3 records (maps) a pixel value of the high-resolution area 10b on the X-Y coordinates whose origin is in the upper left portion of the low-resolution area 10a. In the high-resolution area 10b of original image 1, a value of a pixel whose center is at coordinates (x, y) is defined as g1(x, y). In a similar manner, a pixel value of the high-resolution area 10b of original image 2 is represented as g2(x, y), and a pixel value of the high-resolution area 10b of the original image n is represented as gn(x, y). Assuming that a shift amount of original image 2 with respect to original image 1 is (u, v), an evaluation function $I_{21}(u, v)$ for determining a shift amount of original image 2 with respect to original image 1 is represented as Equation 3. Note that a shift amount can be a positional difference of the same object between similar images.

$$I_{21}(u,v) = E\{g1(x,y) - g2(x+u, y+v)\}^2 \quad \text{Equation 3}$$

Note that u and v each are preferably an integral multiple of a pixel pitch of the high-resolution area 10b. For example, u and v are calculated by using a minimum search method so that a value of the evaluation function $I_{21}(u, v)$ is minimized, and the calculated (u, v) is defined as a shift amount (x2, y2) of original image 2 with respect to original image 1. Note that it is preferable that the search of u and v of the evaluation function I is made in a range where original image 1 and original image 2 overlap in the high-resolution area 10b. Respective shift amounts of original images 2 to n with respect to original image 1 are calculated by the same process.

Next, the signal processor 3 aligns original images 1 to n on the X-Y coordinates by using the calculated shift amounts (step S507). For example, positions on the X-Y coordinates of original images 1 to n can be adjusted by associating the position information on the X-Y coordinates with respective original images 1 to n and rewriting respective position information. Note that the position information may be associated with respective original images 1 to n or may be recorded together as a lookup table in the buffer memory 6. That is, as long as the position information and original images 1 to n have a correlation with each other, it can be said that the position information is associated with original images 1 to n. Pixel values f(Xrn, Ycn) of k original images 1 to k are plotted on the common X-Y coordinates, and images having the number of pixels that is k times the number of original images obtained from the low-resolution area 10a are combined (step S508). FIG. 5 illustrates original images 1 to 6 having six pixel centers 206 that are different for respective pixels. The use of more original images can improve the resolution of a high-definition image up to substantially the same level as a moving average for the pixel size of the ideal image.

As described above in detail, according to the present embodiment, a precise high-definition image can be formed by detecting shift amounts of original images based on images of the high-resolution area 10b. Further, shift amounts can be accurately detected by using the high-resolution area 10b while an image that is superior in the sensitivity and the saturation characteristics is obtained by using the low-resolution area 10a. Furthermore, since the high-resolution area 10b is provided around the low-resolution area 10a, the high-resolution area 10b which is unnecessary in generating a high-definition image can be easily trimmed.

Second Embodiment

While the imaging device that includes the low-resolution area 10a and the high-resolution area 10b having different pixel pitches, respectively, is used in the first embodiment, the advantages of the present technique can be obtained also by using an imaging device in which a pixel pitch is uniform. An image forming apparatus and an image forming method according to the second embodiment will be described below focusing on differences from the first embodiment.

Figure 7:
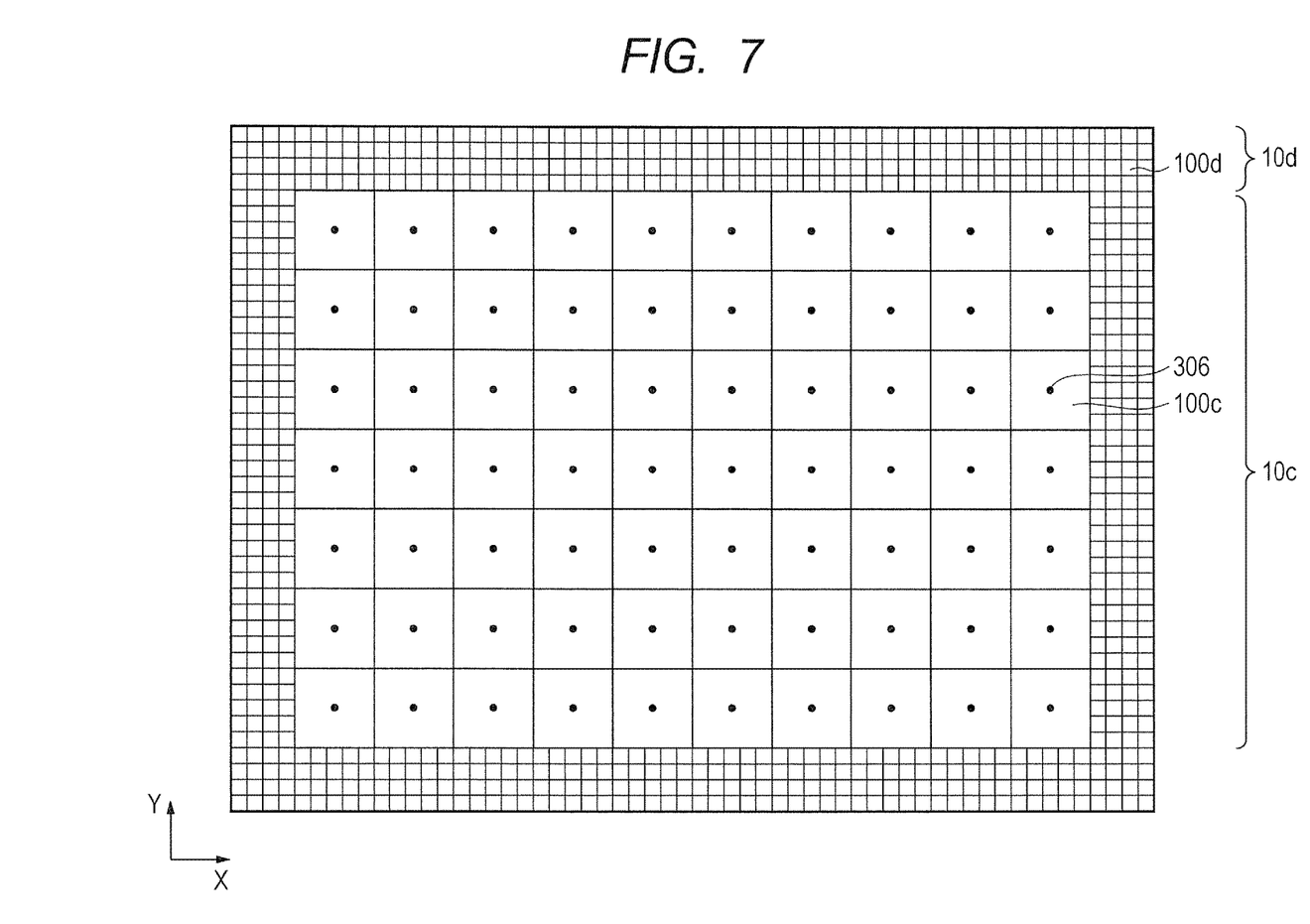
FIG. 7 is a diagram for illustrating an image forming method according to a second embodiment.

The imaging device according to the present embodiment includes a pixel array having a uniform pixel pitch. Although the pixel pitch is desirably a narrow pitch in a similar manner to the pixel pitch of the high-resolution area 10b according to the first embodiment, the pixel pitch is not limited thereto. First, the signal processor 3 reads out a high-resolution original image 1 from the imaging device. Subsequently, the signal processor 3 averages (adds) a plurality of pixels in areas except a peripheral portion of original image 1 and generates a low-resolution area. For example, as illustrated in FIG. 7, a low-resolution area 10c is generated by performing an averaging process of 5×5 pixels. Each averaged pixel 100c has a pixel center 306 in a depicted position. The area to which no average process is applied is depicted as a high-resolution area 10d. The pixel pitch of the pixels 100c of the low-resolution area 10c is five times the pixel pitch of the pixels 100d of the high-resolution area 10d. Original image 1 is generated in such a way that it is saved in the buffer memory 6. Note that high-resolution image data obtained before the averaging process is applied may be saved in the buffer memory 6 and then the low-resolution area 10c may be generated by an averaging process. In a similar manner, the signal processor 3 generates original images 2 to k by an averaging process and calculates shift amounts between original image 1 and original images 2 to k. Shift amounts can be calculated based on images of the high-resolution area 10d in a similar manner to the first embodiment. Furthermore, the signal processor 3 can generate a high-definition image by arranging original images 1 to k on the X-Y coordinates based on the calculated shift amounts.

According to the present embodiment, advantages similar to those in the first embodiment can be obtained using the imaging device having a uniform pixel pitch. That is, since the low-resolution area 10c is generated through an averaging process of a plurality of pixels, the signal-to-noise ratio and the sensitivity of the low-resolution area 10c can be increased compared to those of the high-resolution area 10d. Therefore, shift amounts can be accurately detected by using the high-resolution area 10d while an image with high sensitivity is obtained by using the low-resolution area 10c. Further, since the high-resolution area 10d is provided around the low-resolution area 10c, the high-resolution area 10d which is unnecessary in generating a high-definition image can be easily trimmed. Furthermore, since the low-resolution area 10c has been subjected to an averaging process, a data capacity in the buffer memory 6 can be reduced to improve a usage efficiency of the buffer memory 6.

Further, according to the present embodiment, since the low-resolution area 10c is generated through an averaging process, respective areas and positions of the low-resolution area 10c and the high-resolution area 10d can be changed without changing a hardware configuration. For example, when shift amounts are large as in the case of a subject having large motion, the area of the high-resolution area 10d may be increased. The position of the high-resolution area 10d is not limited to the outer peripheral of the low-resolution area 10c, but may be located on horizontal opposite sides, on vertical opposite sides, or on a diagonal line(s) in the outer peripheral. Further, the pixel pitch of the pixel 100c forming the low-resolution area 10c can be changed. For example, for a low illuminant subject, the number of additions of pixels in the low-resolution area 10c to which an averaging process is applied may be increased and the pixel pitch may be increased.

Third Embodiment

Figure 8A:
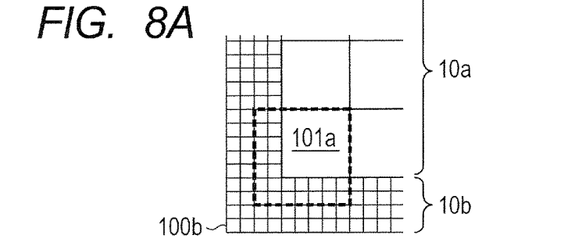
FIG. 8A and FIG. 8B include a circuit diagram of a pixel array according to a third embodiment.
Figure 8B:
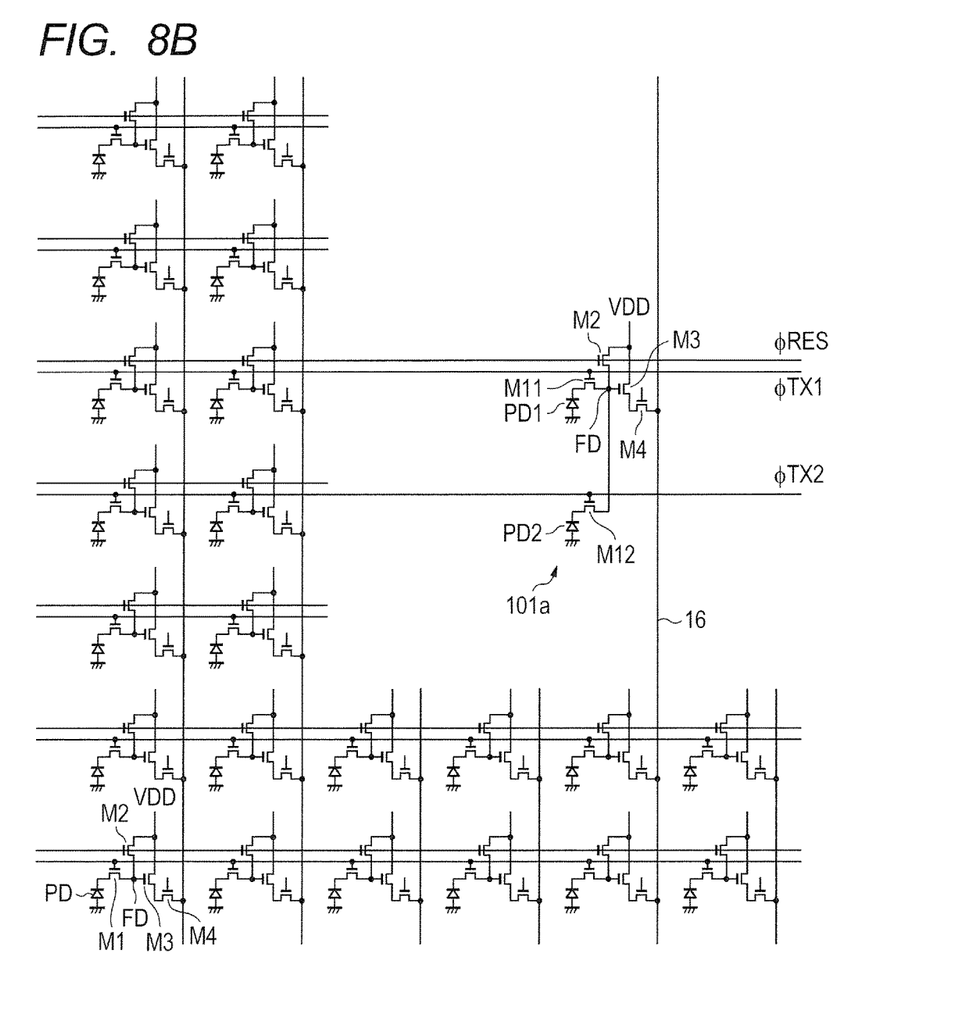

An image forming apparatus and an image forming method according to the third embodiment of the present technique will be described. FIG. 8A and FIG. 8B include a circuit diagram of a pixel array according to the present embodiment. The circuit diagram illustrated in FIG. 8B corresponds to a part of the pixel array 10 surrounded by a broken line in FIG. 8A and illustrates a single pixel 101a located at a corner of the low-resolution area 10a and a plurality of pixels 100b of the high-resolution area 10b adjacent to the single pixel 101a.

The pixel array of the present embodiment is different from the pixel array of the first embodiment in that the pixel 101a of the low-resolution area 10a has two light receiving units. That is, in the pixel 101a, photodiodes PD1 and PD2 and transfer transistors M11 and M12 share the charge-voltage convertor FD, the reset transistor M2, the amplifying transistor M3, and the selection transistor M4. The transfer transistor M11 is driven by a signal line TX1 and the transfer transistor M12 is driven by a signal line TX2. In the present embodiment, the number of signal lines of the transfer transistors M11 and M12 is greater than that in the first embodiment, and therefore, there is an advantage of a higher flexibility of driving. For example, it is possible to realize a function of focus detection by using signals from two light receiving units of the pixel 101a. Further, an image with high sensitivity can be obtained by adding signals from the two light receiving units.

The advantages similar to those of the first embodiment can be obtained also in the present embodiment. A high-definition image with high accuracy can be formed by detecting shift amounts of original images based on images of the high-resolution area 10b. Further, shift amounts can be accurately detected by using the high-resolution area 10b while a high sensitivity image is obtained by using the low-resolution area 10a. Furthermore, the high-resolution area 10b which is unnecessary in generating a high-definition image can be easily trimmed.

Fourth Embodiment

Figure 9A:
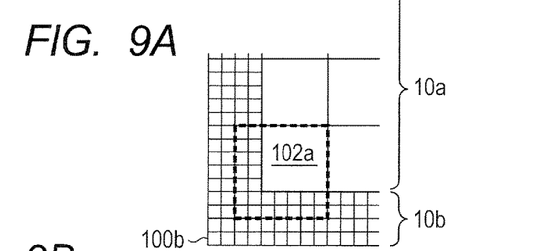
FIG. 9A and FIG. 9B include a circuit diagram of a pixel array according to a fourth embodiment.
Figure 9B:
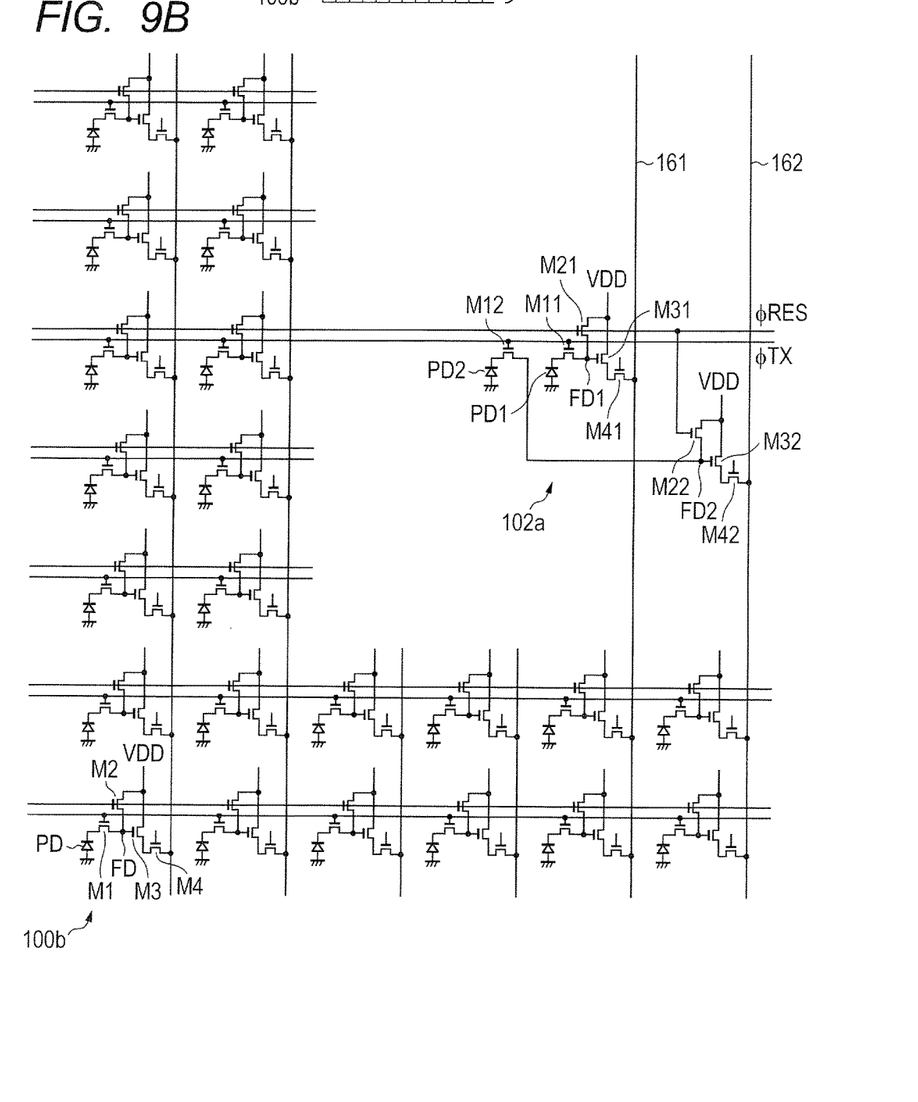

An image forming apparatus and an image forming method according to the fourth embodiment of the present technique will be described. FIG. 9A and FIG. 9B include a circuit diagram of a pixel array according to the present embodiment. The circuit diagram illustrated in FIG. 9B corresponds to a part of a pixel array 10 surrounded by a broken line in FIG. 9A and illustrates a single pixel 102a located at a corner of the low-resolution area 10a and a plurality of pixels 100b of the high-resolution area 10b adjacent to the single pixel 102a.

The pixel 102a includes photodiodes PD1 and PD2, charge-voltage convertors FD1 and FD2, transfer transistors M11 and M12, reset transistors M21 and M22, amplifying transistors M31 and M32, and selection transistors M41 and M42. The transfer transistors M11 and M12 are driven by a common signal line TX, and the reset transistors M21 and M22 are driven by a common signal line RES. The amplifying transistor M31 is electrically connected to a vertical signal line 161 via the selection transistor M41, and the amplifying transistor M32 is electrically connected to a vertical signal line 162 via the selection transistor M42.

While the number of vertical signal lines is greater than that in the first embodiment, there is an advantage of an increased flexibility of driving. Further, the advantages similar to those of the first embodiment can be obtained also in the present embodiment.

Fifth Embodiment

An image forming apparatus and an image forming method according to the fifth embodiment of the present technique will be described. In the present embodiment, original images 1 to k may be read out with respective different exposures or different amplification factors and then these original images 1 to k may be combined. In FIG. 1, with the controller 4 changing the aperture 2b, the signal processor 3 sequentially reads out original images 1 to k from the imaging device 1. This allows original images 1 to k having different exposures to be obtained. Further, original images 1 to k having different amplification factors can be obtained by switching switches SW1 to SW3 of the column amplifier 130 in FIG. 4 to change the feedback capacitors. Furthermore, amplification factors for original images 1 to k may be changed by converting an image signal from an analog form to a digital form and performing a bit shift in digital data.

The signal processor 3 calculates shift amounts of original images 1 to k based on images of the high-resolution area 10b and combines original images 1 to k on the X-Y coordinates based on the shift amounts. Thereby, original images 1 to k having different exposures or amplification factors are combined and a high-definition image to which an expansion process of a dynamic range has been applied is generated. Further, the advantages similar to those of the first embodiment can be obtained also in the present embodiment.

Sixth Embodiment

An image forming apparatus and an image forming method according to the sixth embodiment of the present technique will be described. In the present embodiment, distinctive pixels contained in original images 1 to k may be extracted, and a calculation process and a combining process of shift amounts may be performed based on the positions of the extracted pixels. For example, shift amounts among original images can be obtained by extracting pixels having a high illuminant such as a point light source or pixels having a large variation in brightness or hue and by calculating shift amounts of these positions. For example, it is assumed here that the coordinates of a pixel having the highest illuminant in the high-resolution area 10b of original image 1 are (x1, y1), and the coordinates of a pixel having the highest illuminant in the high-resolution area 10b of original image 2 are (x2, y2). In this case, a shift amount of original images 1 and 2 is (x2−x1, y2−y1). In such a way, by calculating a shift amount of distinctive pixels, a shift amount of original images can be calculated and combined with less calculation load than in the case of performing alignment by using all the pixels of the high-resolution area 10b. As a result, consumption power and calculation time can be reduced. Furthermore, the advantages similar to those of the first embodiment can be obtained also in the present embodiment.

Seventh Embodiment

An image forming apparatus and an image forming method according to the seventh embodiment of the present technique will be described. In the present embodiment, a high-definition image may be generated by using a so-called super-resolution reconstruction process in an addition (combining) process of original images after calculating shift amounts of a plurality of original images. For example, a known super-resolution reconstruction process such as a technique of simply creating a moving-averaged image, an ML (Maximum-Likelihood) technique, an MAP (Maximum A Posterior) technique, a POCS (Projection Onto Convex Set) technique, an IBP (Iterative Back Projection) technique, or the like may be employed. For example, the ML technique can further increase the definition by using the addition process operation of original images as discussed above.

Other Embodiments

The embodiments described above are mere examples of the present invention and can be changed and implemented within the scope not departing from the spirit of the present invention. For example, the imaging device is not limited to a CMOS sensor and is applicable in a CCD sensor. A faster shutter than a mechanical shutter is realized by using a CMOS sensor provided with a global electronic shutter. This allows for a reduced time lag in acquiring a plurality of original images, and blurring is suppressed. Further, instead of moving an imaging device by using an actuator, a plurality of original images having displacements may be read out by utilizing a camera shake amount of a handheld photographing process.

Furthermore, the image forming apparatus according to the present technique may be a universal computer or an image processing device that does not have an imaging device, and any type of these devices can be employed as long as the device can form a high-definition image based on input images. For example, the image forming method of the present technique may be performed by using a universal computer or a smartphone and processing pixel data (RAW data) output from an image sensor. A program executing the image forming method may be recorded in advance in the image forming apparatus, or may be supplied to the image forming apparatus via a recording medium or a network.

According to the present invention, images can be combined with high accuracy by performing position adjustment based on a high-resolution area. Further, a high-definition image that is superior in the sensitivity and the saturation characteristics can be formed by combining images of a low-resolution area.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121779, filed Jun. 17, 2015, which is hereby incorporated by reference herein in its entirety.

What is claimed is:

1. An image forming method comprising:
acquiring a plurality of original images, using a processor, with each of the plurality of original images including a high-resolution area and a low-resolution area, image data for each of the plurality of original images having pixel values corresponding to the high-resolution area and pixel values corresponding to the low-resolution area;
detecting, using the processor, a difference between the pixel values corresponding to the high-resolution area of each of the plurality of original images by comparing the pixel values corresponding to respective high-resolution areas of the plurality of original images;
adjusting, using the processor, position information associated with the plurality of original images, respectively, based on the detected difference between the pixel values corresponding to the high-resolution area of each of the plurality of original images; and
combining, using the processor, the pixel values corresponding to respective low-resolution areas of the plurality of original images in which the position information associated with the plurality of original images is adjusted.

2. The image forming method according to claim 1, wherein the high-resolution area is arranged in an outer peripheral of the low-resolution area.

3. The image forming method according to claim 1, wherein the step of combining includes performing one of a super-resolution reconstruction process and a process of expanding a dynamic range.

4. The image forming method according to claim 1, further including generating the plurality of original images by an imaging device.

5. The image forming method according to claim 4, wherein the imaging device reads out each of the plurality of original images such that, in the step of combining, a number of additions of pixels corresponding to the low-resolution area is greater than a number of additions of pixels corresponding to the high-resolution area.

6. The image forming method according to claim 4, wherein the imaging device comprises:
(a) a first pixel that is used for forming the low-resolution area and is located at a center of an image plane; and
(b) a second pixel that is used for forming the high-resolution area and is located in a peripheral portion of the image plane, and
wherein the first pixel is larger than the second pixel in at least one of (i) an area of an opening, (ii) a pitch of adjacent openings, and (iii) a wiring pitch between adjacent pixels.

7. The image forming method according to claim 4, wherein the imaging device comprises an image plane having a uniform pixel pitch, and
the low-resolution area is formed by adding a plurality of pixels in an area except a peripheral portion of the image plane.

8. An image forming apparatus comprising a processor that executes instructions:
to store a plurality of original images, each of the plurality of original images including a high-resolution area and a low-resolution area, image data for each of the plurality of original images having pixel values corresponding to the high-resolution area and pixel values corresponding to the low-resolution area;
to detect a difference between the pixel values corresponding to the high-resolution area of each of the plurality of original images by comparing the pixel values corresponding to respective high-resolution areas of the plurality of original images;
to adjust, based on the detected difference between the pixel values corresponding to the high-resolution area of each of the plurality of original images, position information associated with the plurality of original images, respectively; and
to combine the pixel values corresponding to respective low-resolution areas of the plurality of original images in which the position information associated with the plurality of original images is adjusted.

9. The image forming apparatus according to claim 8, wherein the high-resolution area is arranged in an outer peripheral of the low-resolution area.

10. The image forming apparatus according to claim 8, further comprising:
(a) a first pixel that is used for forming the low-resolution area and is located at a center of an image plane; and
(b) a second pixel that is used for forming the high-resolution area and is located in a peripheral portion of the image plane,
wherein the first pixel is larger than the second pixel in at least one of (i) an area of an opening, (ii) a pitch of adjacent openings, and (iii) a wiring pitch between adjacent pixels.

11. A non-transitory computer-readable storage medium in which an image forming program is stored, the image forming program configured to be able to cause a computer to execute the steps of:
acquiring a plurality of original images, using the computer, with each of the plurality of original images including a high-resolution area and a low-resolution area, image data for each of the plurality of original images having pixel values corresponding to the high-resolution area and pixel values corresponding to the low-resolution area;
detecting, using the computer, a difference between the pixel values corresponding to the high-resolution area of each of the plurality of original images by comparing the pixel values corresponding to respective high-resolution areas of the plurality of original images;
adjusting, using the computer, position information associated with the plurality of original images, respectively, based on the detected difference between the pixel values corresponding to the high-resolution area of each of the plurality of original images; and combining, using the computer, the pixel values corresponding to respective low-resolution areas of the plurality of original images in which the position information associated with the plurality of original images is adjusted.

\* \* \* \* \*